(12) United States Patent
Hattendorff et al.

(10) Patent No.: US 12,034,135 B2
(45) Date of Patent: Jul. 9, 2024

(54) BATTERY MODULE AND METHOD FOR PRODUCING A BATTERY MODULE

(71) Applicant: WEBASTO SE, Stockdorf (DE)

(72) Inventors: Johannes Hattendorff, Stockdorf (DE); Knut Welke, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 532 days.

(21) Appl. No.: 17/272,644

(22) PCT Filed: Sep. 11, 2019

(86) PCT No.: PCT/EP2019/074186
§ 371 (c)(1),
(2) Date: Mar. 1, 2021

(87) PCT Pub. No.: WO2020/053251
PCT Pub. Date: Mar. 19, 2020

(65) Prior Publication Data
US 2021/0391628 A1 Dec. 16, 2021

(30) Foreign Application Priority Data
Sep. 11, 2018 (DE) .................... 10 2018 122 080.4

(51) Int. Cl.
*H01M 50/35* (2021.01)
*H01M 10/04* (2006.01)
(Continued)

(52) U.S. Cl.
CPC ......... *H01M 10/625* (2015.04); *H01M 10/04* (2013.01); *H01M 10/643* (2015.04);
(Continued)

(58) Field of Classification Search
None
See application file for complete search history.

(56) References Cited

U.S. PATENT DOCUMENTS

2002/0028374 A1\* 3/2002 Yoshida ............ H01M 10/0431
429/94
2010/0316894 A1 12/2010 Hermann et al.
(Continued)

FOREIGN PATENT DOCUMENTS

CN 106233495 A 12/2016
CN 107820641 A 3/2018
(Continued)

OTHER PUBLICATIONS

International Search Report and Written Opinion for International Patent Application No. PCT/EP2019/074186 mailed Nov. 15, 2019, 12 pages.
(Continued)

*Primary Examiner* — Amanda J Barrow
(74) *Attorney, Agent, or Firm* — Haynes and Boone, LLP (57) ABSTRACT

A battery module for constructing a drive battery for a motor vehicle includes a carrier and a plurality of battery cells that are connected to the carrier by means of a casting compound, wherein a venting duct is provided in the casting compound so as to discharge gases from a damaged battery cell. A production method for a battery module of this type is also provided.

19 Claims, 3 Drawing Sheets

(51) Int. Cl.
*H01M 10/625* (2014.01)
*H01M 10/643* (2014.01)
*H01M 10/653* (2014.01)
*H01M 10/6551* (2014.01)
*H01M 50/213* (2021.01)
*H01M 50/227* (2021.01)
*H01M 50/249* (2021.01)
*H01M 50/367* (2021.01)
*H01M 50/383* (2021.01)

(52) U.S. Cl.
CPC ..... *H01M 10/653* (2015.04); *H01M 10/6551* (2015.04); *H01M 50/213* (2021.01); *H01M 50/227* (2021.01); *H01M 50/249* (2021.01); *H01M 50/367* (2021.01); *H01M 50/383* (2021.01); *H01M 2220/20* (2013.01)

(56) References Cited

U.S. PATENT DOCUMENTS

| | | | | |
|---|---|---|---|---|
| 2011/0177366 | A1* | 7/2011 | Nagasaki | H01M 10/659 |
| | | | | 429/83 |
| 2013/0095356 | A1* | 4/2013 | Shimizu | H01M 50/519 |
| | | | | 429/88 |
| 2013/0224574 | A1* | 8/2013 | Favaretto | B60L 3/0046 |
| | | | | 429/186 |
| 2016/0329545 | A1* | 11/2016 | Zhang | H01R 13/533 |
| 2017/0214103 | A1 | 7/2017 | Onnerud et al. | |
| 2018/0175361 | A1 | 6/2018 | Wagner et al. | |

FOREIGN PATENT DOCUMENTS

| | | |
|---|---|---|
| DE | 10 2010 000 106 A1 | 7/2011 |
| DE | 10 2012 0180 48 A1 | 3/2014 |
| DE | 10 2016 214 640 A1 | 2/2018 |
| EP | 2346109 A1 | 7/2011 |
| JP | S 6463264 A | 3/1989 |
| JP | H 03127445 A | 5/1991 |
| JP | H 03134952 A | 6/1991 |
| JP | 2017152172 A | 8/2017 |
| WO | WO 2017001119 A1 | 1/2017 |

OTHER PUBLICATIONS

First Office Action for Chinese Patent Application No. 201980058742.0 dated Sep. 8, 2022; 12 pages.

* cited by examiner

BATTERY MODULE AND METHOD FOR PRODUCING A BATTERY MODULE

CROSS REFERENCE TO RELATED APPLICATIONS

This application is a national stage of International Application No. PCT/EP2019/074186 filed Sep. 11, 2019, which claims priority from German Patent Application 10 2018 122 080.4 filed Sep. 11, 2018 in the German Patent and Trademark Office, the disclosures of which are incorporated herein by reference in their entirety.

BACKGROUND

Technical Area

The present invention relates to a battery module for constructing a battery system for a motor vehicle and to a method for producing such a battery module.

Related Art

Battery modules for constructing a drive battery for a motor vehicle are known, wherein a plurality of battery cells are connected by means of a casting compound to a carrier of the battery module in order to provide more or less a position-securing arrangement and/or an improved thermal connection between the carrier and the battery cells. The casting compound is preferably a thermally conductive casting compound by means of which the thermal connection between the respective battery cell and the carrier can be improved. In this case, the carrier can be used as a heat-conducting element and for example can also actively temper the battery cells in that said carrier provides a heating or cooling process. The thermally conductive casting compound thus provides a thermal connection of the battery cells to the carrier in the sense of so-called "thermal interface materials".

In order to avoid the risk of a battery cell exploding or even to completely avoid such an explosion, it is known to equip the battery cell with a predetermined breaking point that in the event for example of a pressure increase in a battery cell or of a so-called "thermal runaway" of a battery cell opens or fractures above a predetermined pressure and as a result provides an opening via which gas that is present and has formed in the battery cell can be discharged in a controlled manner with the result that pressure can be released from the battery cell, a so-called "venting" of the battery cell.

Such a predetermined breaking point is usually arranged on the positive terminal of a battery, such as illustrated in US 2010/316894 A1. A battery module having battery cells that are held together by means of a casting compound and that comprise positive terminal gas venting openings is known from the DE 10 2010 000 106 A1. According to more recent developments, is also possible to arrange a predetermined breaking point on the positive terminal and/or the negative terminal such as is disclosed in JP 2017 152 172 A.

SUMMARY

An improved battery module for constructing a drive battery for a motor vehicle and a corresponding method for producing such a battery module are described herein according to various embodiments.

Accordingly, a battery module for constructing a drive battery for a motor vehicle is proposed, including a carrier and a plurality of battery cells that are connected to the carrier by means of a casting compound. In accordance with the invention, a venting duct is provided in the casting compound so as to discharge gases out of a damaged battery cell.

By virtue of the fact that a venting duct for discharging gases out of a damaged battery cell is provided in the casting compound, it is possible to realize a mechanical and—in the event of using a thermally conductive casting compound—thermal connection of the battery cell by means of the casting compound essentially without limitations and at the same time to render it possible for gases to be vented, in other words discharged, out of a battery cell even in the region of the casting compound if a battery cell has become damaged.

It is accordingly realized that despite the battery cells being connected by means of the casting compound also in the region of a predetermined breaking point, which is then covered or surrounded by the casting compound, this predetermined breaking point can still be actively used. Particularly in the case of battery cells of younger generations that include predetermined breaking points on two opposite-lying sides for venting purposes, it is still possible now despite the battery cells being connected by means of a casting compound to use both predetermined breaking points for venting purposes, as a result of which the risk of a cell exploding is further reduced.

In other words, it is possible by virtue of providing an additional force-absorbing component by means of the casting compound to realize the advantages achieved by means of casting, i.e. the advantage of an improved mechanical and thermal connection, an advantageous securing arrangement of the position of the battery cells with respect to one another and/or the advantage of improving the safety of the drive battery in the event of the vehicle being involved in an accident, without having to suffer an essential reduction of the venting capacity of the battery module. The venting duct also renders it possible in the region of the casting compound when necessary, for example in the event of a battery cell becoming damaged as a result of an excessive increase in pressure or as a result of a thermal runaway, for venting to take place in the region of the battery cell where casting compound has been provided.

Moreover, the venting duct renders it possible to determine a direction in which the gas that is being released from the damaged battery cell is to be directed. In this case, the venting duct directs the gas along the length of said venting duct. It is thus possible to prevent mostly gases that are escaping out of the battery cell from damaging temperature-sensitive components of the battery module and/or from heating up other battery cells, which could otherwise lead for example to a chain reaction of a thermal runaway amongst the battery cells.

In accordance with a further embodiment, the battery cells include a casing and two opposite-lying terminals for contacting the battery cells, wherein the thermally conductive casting compound surrounds at least one terminal and a section of the casing of the battery cells.

If the battery cells are formed in a cylindrical manner in accordance with some embodiments, this has a particularly advantageous effect on the cooling capacity and also on the achievable energy density of the battery cells.

Alternatively, it is also possible that the battery cells are formed with a prismatic cross-section or are formed in a pancake design or in the form of a "pouch" construction.

In accordance with certain embodiments, the casting compound surrounds both opposite-lying terminals of the battery cells and generally the casing, wherein a venting duct for each of the two opposite-lying terminals of the battery cells may be provided. In several embodiments, the terminals of multiple for example, all battery cells, on one side of the battery cells include a common venting duct.

A simple and cost-effective production of the battery module can be achieved if the venting duct is formed in accordance with a further embodiment by means of a venting core that is housed in the casting compound and that predetermines the dimensions of the venting duct that is provided after the casting process. In this case, it is possible to embody the venting core by means of a hollow tube or by means of a foam that differs from the material of the casting compound and has a predetermined gas permeability or by means of a material that differs from the material of the casting compound and melts above a predetermined temperature, for example polymer foams such as expanded polystyrene (EPS), expanded polypropylene (EPP), expanded polymethyl methacrylate (EPMMA) or polyurethane (PUR) or from hollow chamber materials made from plastic or cellulose, wherein the materials that melt in the case of a predetermined temperature are generally equipped in addition with a flame inhibitor.

It is possible for the production procedure to position the venting core in a simple manner opposite the carrier and the battery cells prior to the casting process and subsequently to encase said venting core at least in part with the casting compound. The venting core accordingly displaces the casting compound so that casting compound is not present in the region of the venting duct even after the casting process but rather that the provided structure of the venting duct remains predetermined by means of the venting core.

In accordance with a further embodiment, the venting duct communicates with a terminal, which is housed in the casting compound, of a battery cell, for example of multiple battery cells, for example of all battery cells. As a consequence, gases that are being released in the region of the respective terminal can be discharged via the venting duct.

If the venting duct forms in a region of one of the terminals that is housed in the casting compound a hollow chamber that communicates with the rest of the venting duct, it is possible to prevent the casting compound that is present in this region from forming a mechanical resistance against the deformation of the terminal or of a predetermined breaking point that is arranged in this region. In other words, material of the battery cell that is to deform in the event of an accident in the case of a desired fracture extends into the hollow chamber without the casting compound preventing it from doing so.

In accordance with some embodiments, the venting core can include at least one hollow chamber which reduces a gas resistance which would otherwise hinder the gas that is being released from the battery cell from flowing freely through the venting duct in particular if the venting core includes the gas-permeable foam and/or the melting material.

In order on the one hand to provide venting at the terminal of the battery cell and simultaneously a thermal connection between the terminal and casting compound, the venting duct can in accordance with a further embodiment overlap only in part a terminal of a battery cell. It some cases, in a plane that is defined by the terminal that is housed in the casting compound, the venting duct has smaller dimensions than the terminal. As a consequence, it is possible on one hand to achieve communication between the terminal and the venting duct and on the other hand to achieve a thermal connection or contact between the terminal and the casting compound.

In accordance with a further embodiment, the venting duct is guided out of the casting compound into the environment in order to dissipate into the environment gases that are released in the case of an accident. As a consequence, it is ensured that the gases that are being released from the battery cell cannot have a negative influence on other components within the battery module.

In order to discharge gases out of the battery cells in a particularly efficient manner, it is possible in accordance with a further embodiment for the battery cells to include predetermined breaking points on both terminals so as to discharge gases in the event of an accident.

In accordance with a further embodiment, a dissipating metal sheet is provided between the terminal and the venting duct or the hollow chamber in order to dissipate the gas flow into the venting duct in order to temper the battery cells and/or in order to electrically contact the respective terminal. In some embodiments, the dissipating metal sheet is perforated in the region of the venting duct and/or the hollow chamber. The perforations render it possible for gases that are being discharged from the battery cell to continue to flow into the venting duct and/or the hollow chamber.

A method for producing a battery module is also described herein according to various embodiments A method is proposed for producing a battery module, including arranging a venting core so as to embody a venting duct on a carrier and arranging a multiplicity of battery cells on the carrier in such a manner that in each case a predetermined breaking point of the respective battery cell communicates with the venting core, and subsequently casting the venting core and parts of the battery cells with a casting compound.

The method renders it possible to achieve in a similar manner the advantages and effects that are mentioned above with respect to the battery module.

BRIEF DESCRIPTION OF THE FIGURES

Further embodiments of the invention are explained in detail by the description below of the figures.

DETAILED DESCRIPTION

Exemplary embodiments are described below with reference to the figures. In so doing, like, similar or like-functioning elements are provided in the different figures with identical reference signs, and in part, a repeated description of these elements is not provided in order to avoid redundancies.

Figure 1:
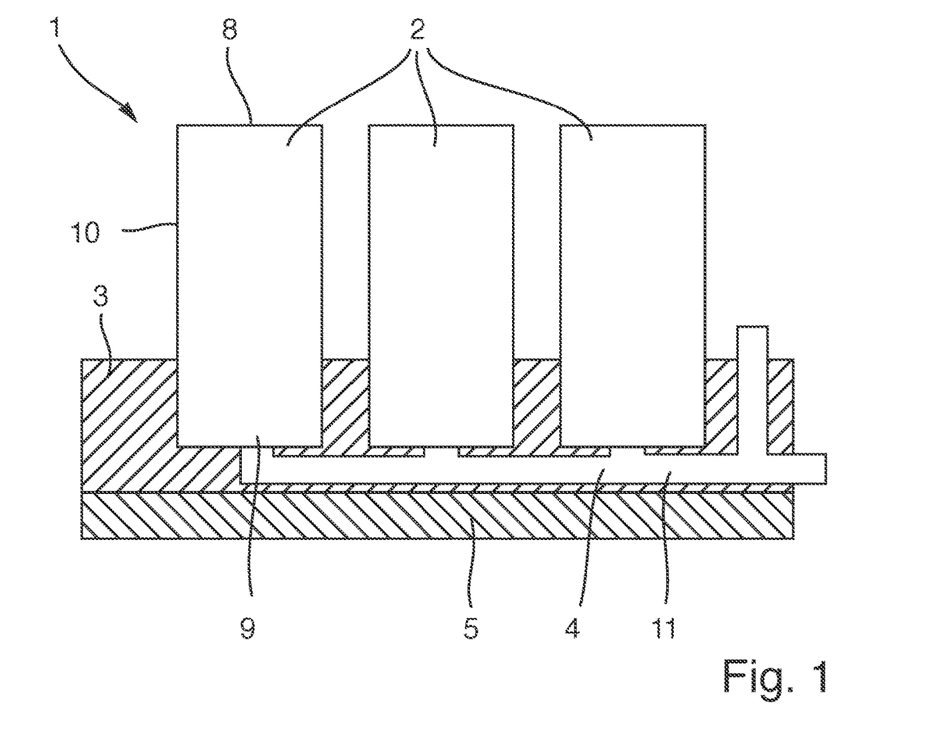
FIG. 1 illustrates schematically a sectional view of a battery module for constructing a drive battery for a motor vehicle in accordance with first embodiment.

FIG. 1 illustrates schematically a sectional view of a battery module 1 for constructing a drive battery for a motor vehicle in accordance a first embodiment.

The battery module 1 includes a carrier 5 and a multiplicity of battery cells 2 that are connected to the carrier 5 by means of a casting compound 3. The casting compound 3 is generally a thermally conductive casting compound 3 by means of which it is possible to effectively transfer heat between the battery cells 2 and the carrier 5.

The carrier 5 can be provided for example in the form of a sheet metal holder in order in this manner to provide a structure for the battery module 1. The carrier 5 can also be provided in the form of a thermally active element in order in this manner to render it possible to temper the battery cells that are accommodated in the battery module 1—for example to cool or heat the battery cells 2. In order to be configured as a thermally active element, the carrier 5 can include for example ducts so as to allow the through-flow of a tempering medium.

When a thermally conductive casting compound is used as the casting compound 3, the battery cells 2 are thermally coupled to the carrier 5 with the result that heat can be transported between the battery cells 2 and the carrier 5.

The battery cells 2 include in this case a casing 10 and for example two opposite-lying terminals 8 and 9 for electrically contacting the battery cells 2. In this case, the casting compound 3 surrounds the second terminal 9 and a section of the casing 10 of the cylindrical battery cells 2.

The battery cells 2 include respectively on both terminals 8, 9 predetermined breaking points (not illustrated) for discharging gases in the event of an accident. Since the second terminal 9 is surrounded by the casting compound 3 and accordingly it would not otherwise be possible for a predetermined breaking point that is located in the casting compound to respond, a venting duct 4 is provided in the casting compound 3 in order to discharge gases from the predetermined breaking point of a damaged battery cell 2.

The venting duct 4 communicates with the second terminal 9 that is housed in the casting compound 3 and consequently also with the region of the predetermined breaking point at least of one of the battery cells 2. In certain embodiments, the venting duct 4 communicates with at least two or also with all of the battery cells 2 that are accommodated in the battery module 1.

In this case, the venting duct 4 is formed in such a manner that it overlaps only in part the second terminal 9 of each battery cell 2 and in a plane that is defined by the terminal that is housed in the casting compound has smaller dimensions than the terminal 9 with the result that the second terminal 9 and the casting compound 3 also include an in part thermal connection.

Moreover, the venting duct 4 is guided in the present case out of the casting compound 3 into the environment in order to discharge into the environment gases that are released in the case of an accident.

The venting duct 4 is formed by a venting core 11 that is housed in the casting compound 3, wherein the venting core 11 is formed in the illustrated embodiment in the form of a hollow tube.

Alternatively, it is possible to embody the venting core 11 by means of a foam that differs from the casting compound 3 and has a predetermined gas permeability or by means of a material that differs from the—generally thermally conductive—casting compound 3 and melts above a predetermined temperature, for example polymer foams such as EPS, EPP, EPMMA or PUR or from hollow chamber materials made from plastic or cellulose, wherein the materials that melt in the case of a predetermined temperature are typically equipped in addition with a flame inhibitor.

The venting core 11 is of particular importance during the production of the battery module 1 since by means of the venting core 11 the venting duct 4 is formed on the carrier 5 during the process of casting the battery cells 2 by means of the casting compound 3. The casting compound 3 is displaced by means of the venting core 11 so as to embody the venting duct 4 and thus renders it possible to embody the venting duct 4 in the casting compound 3 in a simple, reliable and cost-effective manner.

Figure 2:
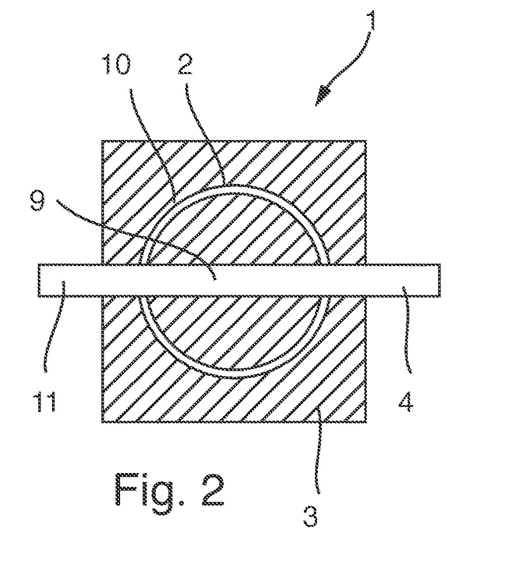
FIG. 2 illustrates schematically a plan view of a battery cell of the battery module shown in FIG. 1.

FIG. 2 illustrates schematically a plan view viewed from the direction of the carrier 5 towards the battery cell 2 of the battery module 1 shown in FIG. 1 in a central region of the battery module 1. The battery cell 2 is indicated in this case by means of its casing 10. It is immediately apparent that the venting duct 4, starting from one side, extends via the end face of the battery cell 2 towards the opposite-lying side, and thus a continuous venting duct 4 is formed, which communicates with the second terminal 9 of the individual battery cells 2. In order to achieve direct communication, it is also possible to provide a branch from the venting duct 4 to the terminal 9.

Figure 3:
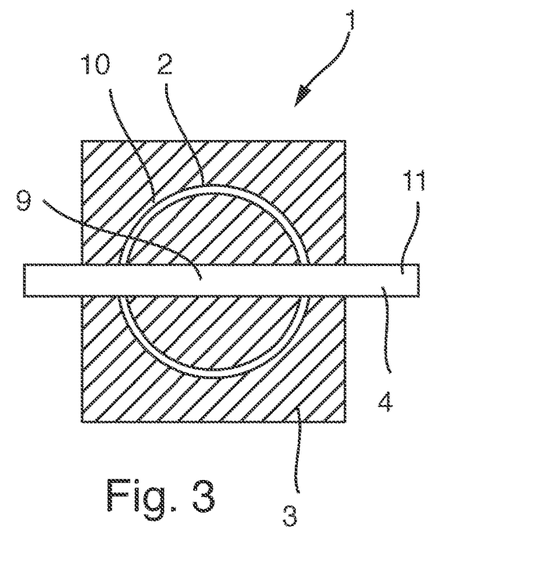
FIG. 3 illustrates schematically a plan view of a further battery cell of the battery module shown in FIG. 1.

FIG. 3 illustrates schematically a plan view viewed from the direction of the carrier 5 towards a battery cell 2 that is arranged on the edge of the battery module 1 shown in FIG. 1. In the case of this battery cell 2, the venting duct 4 terminates in the region of the second terminal 9 in the casting compound 3.

Figure 4:
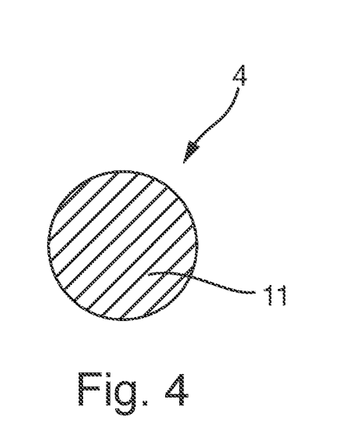
FIG. 4 illustrates schematically a cross-sectional view through a venting core in accordance with a first embodiment.

FIG. 4 illustrates schematically a cross-sectional view through a venting core 11 in accordance with a first embodiment which is formed with a predetermined gas permeability by means of a foam that differs from the casting compound 3. Alternatively, the venting duct 11 can be formed by means of a material that differs from the casting compound 3 and melts above a predetermined temperature.

Figure 5:
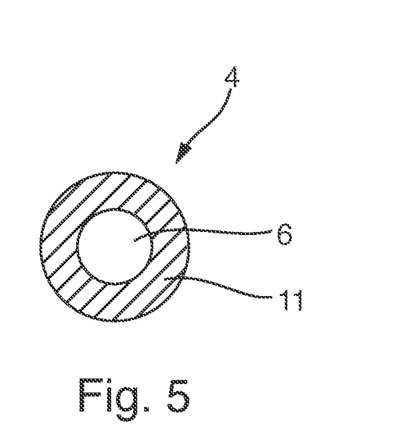
FIG. 5 illustrates schematically a cross-sectional view through a venting core in accordance with a second embodiment.

FIG. 5 illustrates schematically a cross-sectional view through a venting core 11 in accordance with a further embodiment. The venting core 11 includes a hollow chamber 6 which extends along the venting core 11 with the result that the venting duct 4 that is described with regard to FIG. 1 is provided in the form of the hollow tube.

Figure 6:
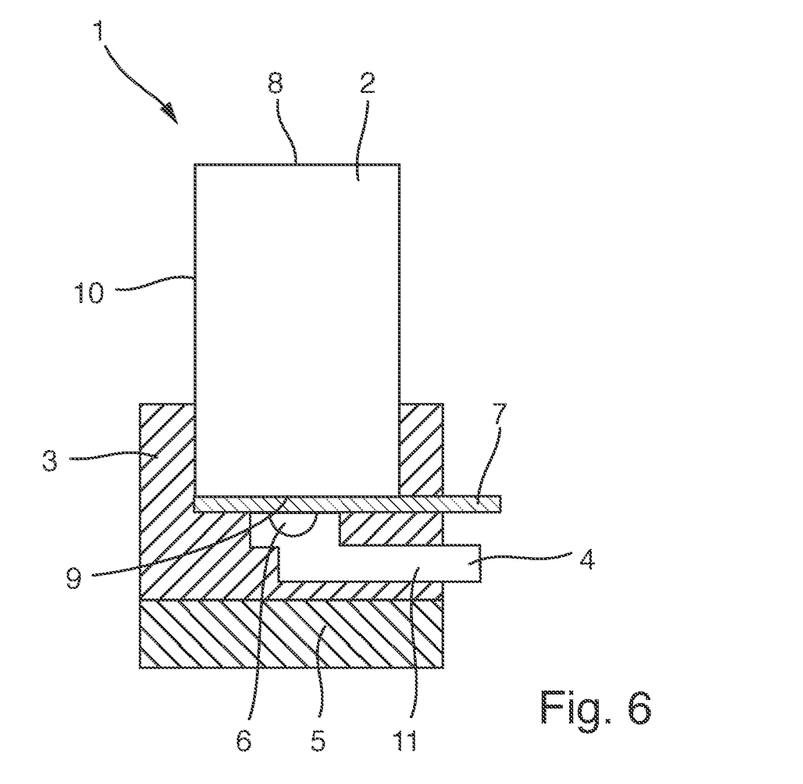
FIG. 6 illustrates schematically a sectional view through a battery module in accordance with a further embodiment.

FIG. 6 illustrates schematically a sectional view through a battery module 1 in accordance with a further embodiment. The construction of the battery module 1 corresponds essentially to that shown in FIG. 1, wherein the venting core 11 is formed by a gas-permeable foam. The venting core 11 can include at least in part the material that melts above a predetermined temperature or can be formed entirely from said material.

Moreover, a dissipating metal sheet 7 that electrically contacts the second terminal 9 of the individual battery cells 2 is arranged on the side of the battery cells 2 that is encased by the casting compound 3. The dissipating metal sheet 7 includes in the region of the terminal 9 in each case a perforation (not illustrated) which renders it possible for gas to pass through the dissipating metal sheet 7. The dissipating metal sheet 7 renders it possible to electrically contact the terminal 9.

Moreover, the venting duct 4 forms in the region of the terminal 9 that is housed in the casting compound 3 a hollow chamber that communicates with the rest of the venting duct 4 and is arranged in the region of the predetermined breaking point of the terminal 9 and in the region of the perforation of the dissipating metal sheet 7.

Figure 7:
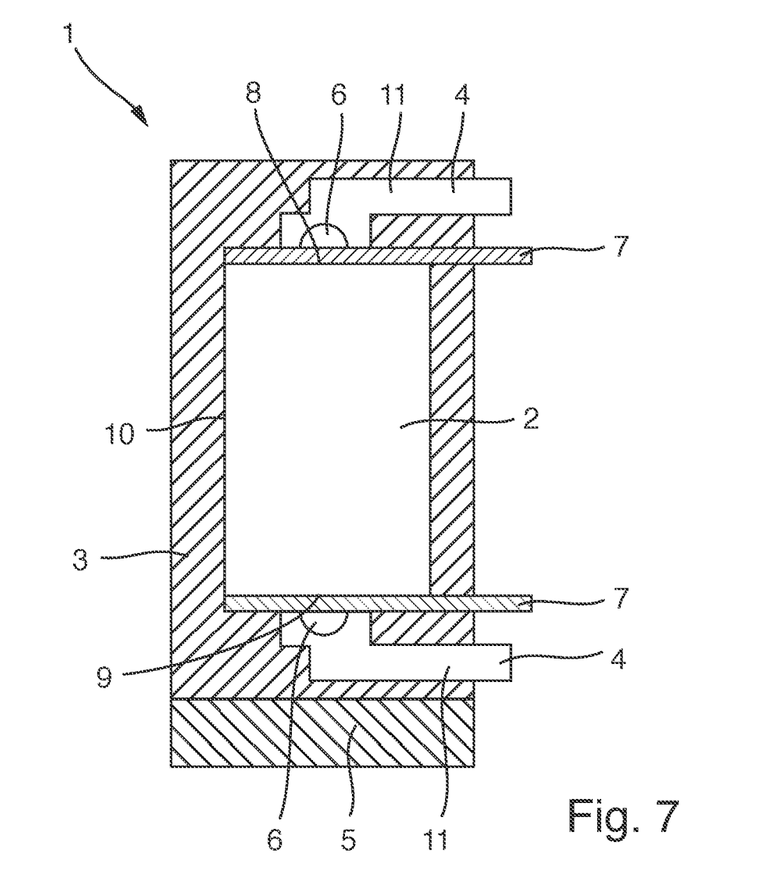
FIG. 7 illustrates schematically a sectional view through a battery module in accordance with a further embodiment.

FIG. 7 illustrates schematically a sectional view through a battery module 1 in accordance with a further embodiment. The battery module 1 corresponds essentially to that shown in FIG. 6 wherein the casting compound 3 completely surrounds the individual battery cells 2, thus both terminals 8, 9 and the casing 10.

Accordingly, a venting duct 4 having the venting core 11 and the hollow chamber 6 are provided on both sides of the battery cells 2—as described with regard to FIG. 6 with respect to the terminal 9, wherein a common venting duct 4 is provided for all first terminals 8 and a common venting duct 4 for is provided for all second terminals 9, respectively.

A method for producing a battery module 1 in accordance with FIG. 1 is described below. The method describes the steps of arranging the venting core 11 so as to embody a venting duct 4 on the carrier 5 and the step of arranging the multiplicity of battery cells 2 on the carrier 5 in such a manner that in each case a predetermined breaking point (not illustrated) of the respective battery cell 2 communicates with the venting core 11. Subsequently, the venting core 11 and parts of the battery cells 2 are cast with a casting compound 3. In various embodiments, a thermally conductive casting compound 3 is used for the casting process.

Where applicable, all individual features that are illustrated in the exemplary embodiments can be combined with one another and/or exchanged without abandoning the scope of the invention.

The invention claimed is:

1. A battery module for constructing a drive battery for a motor vehicle, comprising:
   a carrier; and
   a plurality of battery cells that are connected to the carrier by a casting compound, wherein:
   the casting compound comprises a venting duct configured to discharge gases from a damaged battery cell, and
   the venting duct is formed by a venting core that is housed in the casting compound, and the venting core is formed by (i) a hollow tube, (ii) a foam that is different from the casting compound and has a predetermined gas permeability or (iii) a material that is different from the casting compound and melts above a predetermined temperature.

2. The battery module of claim 1, wherein:
   the plurality of battery cells each comprise a casing and two opposite-lying terminals configured to contact each battery cell, and
   the casting compound surrounds at least one terminal and a section of the casing of each of the plurality of battery cells.

3. The battery module of claim 1, wherein the plurality of battery cells are each formed in a cylindrical shape.

4. The battery module of claim 1, wherein the venting core is formed by the foam and the foam comprises a polymer foam.

5. The battery module of claim 4, wherein the polymer foam comprises expanded polystyrene (EPS), expanded polypropylene (EPP), expanded polymethyl methacrylate (EPMMA), or polyurethane (PUR).

6. The battery module of claim 1, wherein the venting core is formed by a hollow tube, and the hollow tube comprises plastic or cellulose.

7. The battery module of claim 1, wherein the venting core is formed by the material that is different from the casting compound, and the material is equipped with a flame inhibitor.

8. The battery module of claim 1, wherein: the plurality of battery cells each comprise two opposite-lying terminals configured to contact each battery cell, the casting compound surrounds a terminal of each of the plurality of battery cells, and the venting duct communicates with a terminal of at least one battery cell from the plurality of battery cells.

9. The battery module of claim 8, wherein the at least one battery cell comprises the plurality of battery cells.

10. The battery module of claim 1, wherein:
    the plurality of battery cells each comprise two opposite-lying terminals configured to contact each battery cell,
    the casting compound surrounds a terminal of each of the plurality of battery cells, and
    the venting duct forms a hollow chamber that communicates with the rest of the venting duct in a region of the terminal.

11. The battery module of claim 1, wherein:
    the plurality of battery cells each comprise two opposite-lying terminals configured to contact each battery cell,
    the casting compound surrounds one terminal of the two opposite-lying terminals of each of the plurality of battery cells,
    the venting duct overlaps the one terminal in part, and
    in a plane that is defined by the one terminal, the venting duct has smaller dimensions than the one terminal.

12. The battery module of claim 1, wherein the venting duct extends out of the casting compound into an environment that enables gases that are released in a case of an accident to be discharged to the environment.

13. The battery module of claim 1, wherein:
    the plurality of battery cells each comprise two opposite-lying terminals configured to contact each battery cell, and
    the plurality of battery cells each comprise, on the two opposite-lying terminals, predetermined breaking points for discharging gases in an event of an accident.

14. The battery module of claim 1,
    wherein the plurality of battery cells each comprise two opposite-lying terminals configured to contact each battery cell,
    wherein the venting duct forms a hollow chamber that communicates with the rest of the venting duct in a region of a terminal, and
    further comprising a dissipating metal sheet provided between the terminal and the venting duct or the hollow chamber to dissipate gas flow into the venting duct to temper a battery cell and/or to electrically contact the terminal.

15. The battery module of claim 1, wherein the casting compound comprises a thermally conductive casting compound.

16. The battery module of claim 1, wherein the carrier comprises a thermally active carrier configured to temper the plurality of battery cells.

17. A method for manufacturing the battery module of claim 14, comprising:
    providing the carrier and the plurality of battery cells, wherein:
    the plurality of battery cells each comprise two opposite-lying terminals configured to contact each battery cell, and the plurality of battery cells each comprise, on the two opposite-lying terminals, predetermined breaking points that enable gases to be discharged in an event of an accident;

positioning the venting core in between the carrier and the plurality of battery cells;

arranging the plurality of battery cells on the carrier so that at least one of the predetermined breaking points of each battery cell from the plurality of battery cells communicates with the venting core; and casting the venting core and a portion of each battery cell from the plurality of battery cells with a casting compound.

18. The method of claim 17, wherein the casting compound comprises a thermally conductive casting compound.

19. The method of claim 17, wherein the carrier comprises a thermally active carrier configured to temper the plurality of battery cells.

\* \* \* \* \*

UNITED STATES PATENT AND TRADEMARK OFFICE
CERTIFICATE OF CORRECTION

| | |
|---|---|
| PATENT NO. | : 12,034,135 B2 |
| APPLICATION NO. | : 17/272644 |
| DATED | : July 9, 2024 |
| INVENTOR(S) | : Johannes Hattendorff and Knut Welke |

It is certified that error appears in the above-identified patent and that said Letters Patent is hereby corrected as shown below:

In the Claims

Claim 17, Column 8, Line 60, change "claim 14, comprising:" to --claim 1, comprising:--.

Signed and Sealed this
First Day of October, 2024

Katherine Kelly Vidal
*Director of the United States Patent and Trademark Office*